Patented Nov. 27, 1934

1,982,553

UNITED STATES PATENT OFFICE 1,982,553

AZO COMPOUNDS AND THEIR PRODUCTION

Arthur Stoll and August Binkert, Basel, Switzerland, assignors to firm Chemical Works Formerly Sandoz, Basel, Switzerland No Drawing. Application March 30, 1933, Serial No. 663,660. In Germany April 9, 1932

12 Claims. (Cl. 260—79)

The present invention relates to the manufacture of azo compounds which are medicinal substances.

It has been found that 1,8-aminonaphtholsulphonic acids containing in their molecule bile acid radicals yield by their combination with diazo bodies compounds possessing therapeutical properties.

As bile acid derivatives of 1.8-aminonaphtholsulphonic acids, the compounds prepared according to the process of the United States patent application Ser. No. 659,235 filed by the same applicants on March 1, 1933, may be used. These products are characterized by the presence of at least one molecule of an unsubstituted or substituted bile acid, linked to the aminonaphthol molecule by means of an amide linkage. Such compounds are for example cholylamino-, desoxycholylamino-, glycocholylamino-, taurocholylamino-, acetylcholylamino-, acetylglycocholylamino-, diformyldesoxycholylamino- naphtholmono- and -disulphonic acids.

As diazo compounds a very great number thereof can be used. The following ones may be cited, but it is not intended to restrict the invention to the use of the compounds cited hereafter. Preferably there are used the diazo compounds prepared from aniline, toluidine, sulphanilic acid, nitraniline, chloraniline, anthranilic acid, aminophenol, naphthylamine, aminonaphthol, naphthylaminesulphonic acids, aminonaphtholsulphonic acids, phenylenediamine, benzidine, anisidine, tolidine, 4.4'-diaminostilbene-2.2'-disulphonic acid, aminodiphenylamine, α-aminoanthraquinone, aminoazobenzene, etc.

In order to prepare the desired compounds the above cited bile acid derivatives are dissolved in water preferably in presence of a sufficient quantity of an acid binding agent such as sodium carbonate or bicarbonate and the diazo compounds prepared from aromatic mono- or polyamines or of aminoazo dyestuffs are added thereto. The reaction being equimolecular, it is preferable to use one molecule of the bile acid derivative for one molecule of a diazo compound containing one diazo group or a half molecule of a compound containing two diazo groups.

It is further preferable to carry out the copulation in an aqueous alkaline medium or in presence of acid binding agents such as sodium carbonate, potassium carbonate, sodium hydroxide, sodium acetate and the like, capable of neutralizing the mineral acids formed during the copulation. It is further advantageous to carry out the operation of copulation at relatively low temperatures, say at 0° C.–15° C., but in some cases higher temperatures may be used in order to more rapidly obtain the formation of the compounds.

The compounds are generally easily soluble in water and there are several methods that can be used in order to isolate them in a more or less pure form. They can for example be salted out or be precipitated by means of organic solvents miscible with water, such as methanol, ethanol or acetone.

As it is intended to use the compounds prepared according to the present process for therapeutical purposes, they are preferably carefully purified and separated from mineral salts and some starting material that has not entered into reaction. They are, therefore, advantageously subjected to one or more reprecipitations and if necessary dialyzed.

In the dry state the compounds prepared according to the invention are colored powders, easily soluble in water with a coloration which depends on the diazo compound used for their preparation. According to the used products they yield yellow, orange, red, violet or blue solutions which possess a neutral reaction and may be used for therapeutical purposes. All these compounds are characterized in that they contain at least one bile acid radical in the molecule. By heating their aqueous solutions with mineral acids, such as hydrochloric acid, sulphuric acid etc., it becomes possible to split off the bile acid linked to the aminonaphthol compound used as starting material, and to well characterize their nature in this manner. By treating them with alkaline or acid reducing agents, it is possible to reduce the azo group or groups and to obtain well characterized compounds.

By using strongly acid reacting reducing agents at an elevated temperature, the reduction of the azo group is accompanied by the splitting off of the bile acid radical linked to the aminonaphtholsulphonic acid. Thus, one of the splitting products will be a diaminonaphtholsulphonic acid free from any bile acid radical. But by carrying out the reduction of the compounds with alkaline reducing agents it is possible to obtain splitting products still containing combined bile acid.

The compounds prepared according to the present invention possess very valuable bactericide and disinfecting properties and can be used for various chemo-therapeutical applications.

One object of the present invention is to provide a process for the manufacture of new therapeutically useful compounds containing in the molecule at least one bile acid radical.

Another object of the present invention is to provide a process for the manufacture of new therapeutically useful azo compounds consistsing in combining bile acid derivatives of 1,8-aminonaphtholsulphonic acids with diazo compounds prepared from aromatic mono- or poly-amines or aminoazo dyestuffs, whereby the copulation is preferably carried out in an aqueous medium and in presence of acid binding agents.

A further object of the present invention is to provide new therapeutically useful azo compounds containing in the molecule at least one bile acid radical, which compounds are easily soluble in water and possess bactericidal and disinfecting properties and can be used for combating diseases generated by the presence of microorganisms.

The following examples, without being limitative, illustrate the present invention, the parts being by weight.

Example 1

19.0 parts of 1,8,2,4-cholalylaminonaphtholdisulphonic acid are dissolved together with 10 parts of sodium bicarbonate in 100 parts of water. To the solution so obtained there is added at 40° C. a solution of the diazo compound prepared from 9.5 parts of 1,8,3,6-aminonaphtholdisulphonic acid in 150 parts of water. The formation of the compound takes place immediately. The solution is then heated slowly up to 60° C., left at this temperature for about 30 minutes and allowed to cool down. Then 600 parts of methanol and 2200 parts of ether are added thereto. After standing for a short time, the colorless methanol-ether solution is separated and the precipitated compound is dissolved in 25 parts of water, dialyzed in order to separate the mineral acid salts and precipitated by the treating the solution with 500 parts of absolute alcohol and 500 parts of ether.

After filtration and washing with ether, the product is dried in vacuo. In the dry state it is a dark violet powder, easily soluble in water to a neutral and dull red-violet solution, sparingly soluble in methanol, difficulty in ethanol and insoluble in ether. In concentrated sulphuric acid it gives a dull red-violet solution.

It is possible to prepare in the same manner the compound from 1,8,3,6-cholalylaminonaphthol-disulphonic acid and the diazo compound from 1,8,3,6-aminonaphtholdisulphonic acid. The compound thus obtained is a dark violet powder, soluble in water with a red-violet coloration, sparingly soluble in methanol, difficultly soluble in ethanol, insoluble in ether, benzene and chloroform. In concentrated sulphuric acid it gives a dull blue-violet solution, which becomes black on standing.

Example 2

To a solution of 36.6 parts of 1,8,3,6-cholalyl-aminonaphtholdisulphonic acid and of 20 parts of soda in 250 parts of water there is added at 10° C. a solution of the tetrazo compound prepared from 10.6 parts of o-tolidine, and the reaction mixture left to stand at this temperature for seven hours, then heated up to 30° C. After standing overnight, the compound is precipitated by means of an addition of 3000 parts of alcohol, dialyzed and purified. After drying in vacuo it constitutes a dark violet powder, soluble in water with a dark blue coloration and neutral reaction, soluble in alcohol with a violet coloration, but insoluble in ether, benzene and ethylacetate. Its solution in concentrated sulphuric acid is of a pure dark blue shade.

It is obviously possible to use other diazo- or tetrazo compounds prepared from sulphonated or unsulphonated mono- and poly-amines or of aminoazo dyestuffs.

The following examples show the shades of the aqueous solution obtained by dissolving compounds prepared according to the present process:

| | Diazo compound from— | Coupled with— | Shade of the aqueous solution |
|---|---|---|---|
| 1 | Aniline | Cholalylaminonaphtholdisulphonic acid 1,8,3,6 | Light red. |
| 2 | ----do---- | Cholalylaminonaphtholdisulphonic acid 1,8,2,4 | Do. |
| 3 | p-toluidine | Cholalylaminonaphtholdisulphonic acid 1,8,3,6 | Red. |
| 4 | ----do---- | Cholalylaminonaphtholdisulphonic acid 1,8,2,4 | Do. |
| 5 | p-nitraniline | Cholalylaminonaphtholdisulphonic acid 1,8,3,6 | Blood-red. |
| 6 | ----do---- | Cholalylaminonaphtholdisulphonic acid 1,8,2,4 | Dark red. |
| 7 | o-anisidine | Cholalylaminonaphtholdisulphonic acid 1,8,3,6 | Violet-red. |
| 8 | ----do---- | Cholalylaminonaphtholdisulphonic acid 1,8,2,4 | Do. |
| 9 | p-aminobenzoic acid | Desoxycholalylaminonaphtholdisulphonic acid 1,8,3,6. | Dark red. |
| 10 | Ethylester of p-aminobenzoic acid | ----do---- | Do. |
| 11 | Ethylester of 5-aminosalicylic acid | ----do---- | Red-violet. |
| 12 | 4-amino-3,5-diiodobenzoic acid | Cholalylaminonaphtholdisulphonic acid 1,8,3,6 | Blood red. |
| 13 | ----do---- | Cholalylaminonaphtholdisulphonic acid 1,8,2,4 | Do. |
| 14 | 4-amino-2,6-diiodophenol | Cholalylaminonaphtholdisulphonic acid 1,8,3,6 | Dull violet. |
| 15 | ----do---- | Cholalylaminonaphtholdisulphonic acid 1,8,2,4 | Weak red-violet. |
| 16 | Sulphanilic acid | Diformyldesoxycholalylamino-8-naphthol-4-sulphonic acid. | Carmin-red. |
| 17 | Arsanilic acid | ----do---- | Dark red. |
| 18 | Naphthionic acid | ----do---- | Violet. |
| 19 | Naphthylamin-trisulphonic acid 1,3,6,8 | Cholalylaminonaphtholdisulphonic acid 1,8,3,6 | Carmin-red. |
| 20 | Aminonaphthol-sulphonic acid 2,5,7 | ----do---- | Violet red. |
| 21 | Aminonaphthol-disulphonic acid 1,8,3,6 | Desoxycholalylaminonaphtholdisulphonic acid 1,8,2,4. | Blue. |
| 22 | ----do---- | Desoxycholalylaminonaphtholdisulphonic acid 1,8,3,6. | Red-violet. |
| 23 | ----do---- | Diformyldesoxycholalylamino-8-naphthol-phonic acid. | Blue-violet. |
| 24 | 2,3'-dimethyl-4'-aminoazo-benzene | ----do---- | Dark wine-red. |
| 25 | Benzidine | 2-cholalylaminonaphtholdisulphonic acid 1,8,3,6 | Dark violet. |
| 26 | o-tolidine | {1-cholalylaminonaphtholdisulphonic acid 1,8,3,6 / 1-aminonaphtholdisulphonic acid 1,8,3,6} | Blue. |
| 27 | 1,5-aminoanthraquinone sulphonic acid | Cholalylaminonaphtholdisulphonic acid 1,8,3,6 | Violet. |
| 28 | 2,7-dimethyl-6-aminoacridine | ----do---- | Red-violet. |

What we claim is:

1. A process for the manufacture of azo compounds containing bile acid radicals, characterized in that bile acid amides of 1,8-aminonaphtholsulphonic acids are combined with diazo compounds of aromatic amino compounds selected from the class consisting of diazotizable monoamines, polyamines and aminoazo dyestuffs.

2. A process for the manufacture of azo compounds containing bile acid radicals, characterized in that bile acid amides of 1.8-aminonaphtholsulphonic acids are combined in presence of acid binding agents with diazo compounds of aromatic amino compounds selected from the class consisting of diazotizable monoamines, polyamines and aminoazo dyestuffs.

3. A process for the manufacture of azo compounds containing bile acid radicals, characterized in that bile acid amides of 1,8-aminonaphthosulphonic acids are combined in an alkaline medium with diazo compounds of aromatic amino compounds selected from the class consisting of diazotizable monoamines, polyamines and aminoazo dyestuffs.

4. A process for the manufacture of azo compounds containing bile acid radicals, characterized in that cholalylaminoaphtholsulphonic acids are combined in presence of acid binding agents with diazo compounds of aromatic amino compounds selected from the class consisting of diazotizable monoamines, polyamines and aminoazo dyestuffs.

5. A process for the manufacture of an azo compound, containing a cholic acid radical, characterized in that 1,8,2,4-cholalylaminonaphtholdisulphonic acid is combined in presence of sodium bicarbonate with 1,8,3,6-diazo-naphtholdisulphonic acid.

6. A process for the manufacture of an azo compound, containing a cholic acid residue, characterized in that 1,8,3,6-cholalylaminonaphtholdisulphonic acid is combined in presence of sodium bicarbonate with 1,8,3,6-diazonaphtholdisulphonic acid.

7. A process for the manufacture of an azo compound, containing two cholic acid radicals, characterized in that 1,8,3,6-cholalylaminonaphtholdisulphonic acid is combined in presence of sodium carbonate with tetrazotized o-tolidine.

8. Aromatic azo compounds containing as coupling components at least one bile acid amide of a 1,8-aminonaphthol sulphonic acid, which are in dry state colored compounds, easily soluble in water, yielding colored and neutral solutions, which are difficultly soluble in ethanol and insoluble in ether, which when treated with warm mineral acids yield as splitting products free bile acids, which when treated with reduction agents become decolored and which possess bactericidal properties.

9. Aromatic azo compounds containing as coupling component at least one bile acid amide of a 1,8-aminonaphthol sulphonic acid, which are in dry state colored compounds easily soluble in water yielding colored and neutral solutions, which are difficultly soluble in ethanol and insoluble in ether, which when treated with warm mineral acids yield as splitting product free cholic acid, which when treated with reducing agents become decolored and which possess bactericidal properties.

10. Azo compound of the probable formula:

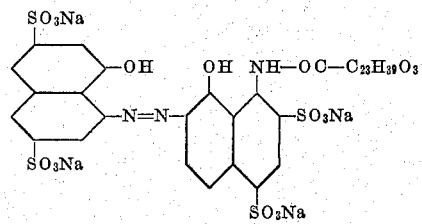

which constitutes in dry state a dark violet powder, easily soluble in water, yielding a neutral and a dull-red violet solution, which is difficultly soluble in ethanol, insoluble in ether and which gives in concentrated sulphuric acid a dull red-violet solution, which when treated with warm mineral acid yields as splitting product free cholic acid, which when treated with reducing agents becomes decolored and which possesses bactericidal properties.

11. Azo dyestuff of the probable formula:

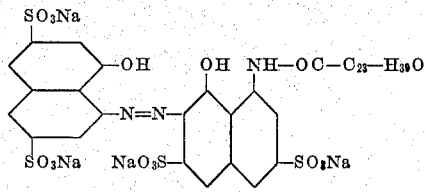

which constitutes in dry state a dark violet powder, easily soluble in water yielding a neutral and red-violet solution, which is difficultly soluble in ethanol, insoluble in ether and which gives in concentrated sulphuric acid a dull blue-violet solution, which when treated with warm mineral acid yield as splitting products free cholic acid, which when treated with reducing agents becomes decolored and which possesses bactericidal properties.

12. Azo dyestuff of the probable formula:

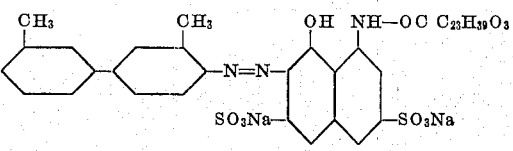

which constitutes in dry state a dark violet powder easily soluble in water to a neutral and a dark blue solution, which is soluble in ethanol to a violet solution, but insoluble in ether, which yields in concentrated sulphuric acid a pure dark blue solution, which when treated with warm mineral acid yields as splitting product free cholic acid, which when treated with reducing agents becomes decolored and which possesses bactericidal properties.

ARTHUR STOLL.
AUGUST BINKERT.